United States Patent [19]

Barnum

[11] Patent Number: 4,551,654
[45] Date of Patent: Nov. 5, 1985

[54] LIGHTING CONTROL SYSTEM AND METHOD

[75] Inventor: Charly Barnum, Saddle River, N.J.

[73] Assignee: Kesser Electronics International, Inc., Totowa, N.J.

[21] Appl. No.: 615,545

[22] Filed: May 31, 1984

Related U.S. Application Data

[63] Continuation of Ser. No. 270,850, Jun. 5, 1981, abandoned.

[51] Int. Cl.[4] ............................................. H05B 37/02
[52] U.S. Cl. ..................................... 315/159; 340/541; 343/5 PD; 367/93; 367/94
[58] Field of Search ................. 315/159; 340/573, 541, 340/544, 554; 367/93, 98, 94; 343/5 PP

[56] References Cited

U.S. PATENT DOCUMENTS

| | | | |
|---|---|---|---|
| 2,903,683 | 9/1959 | Bagno | 367/94 |
| 3,459,961 | 8/1969 | Ravas | 367/94 |
| 3,513,463 | 5/1970 | Stevenson | 367/93 |
| 3,594,768 | 7/1971 | Harris | 367/94 |
| 3,646,506 | 2/1972 | Suter | 367/94 |
| 4,193,055 | 3/1980 | Barnum | 367/94 |
| 4,305,021 | 12/1981 | Schreiden | 315/159 |

Primary Examiner—Harold Dixon
Attorney, Agent, or Firm—Arthur A. March; John L. Isaac

[57] ABSTRACT

A lighting control circuit responsive to amplitude variations related to the effects of movement on the reflection of electromagnetic energy at an ultrasonic frequency.

8 Claims, 4 Drawing Figures

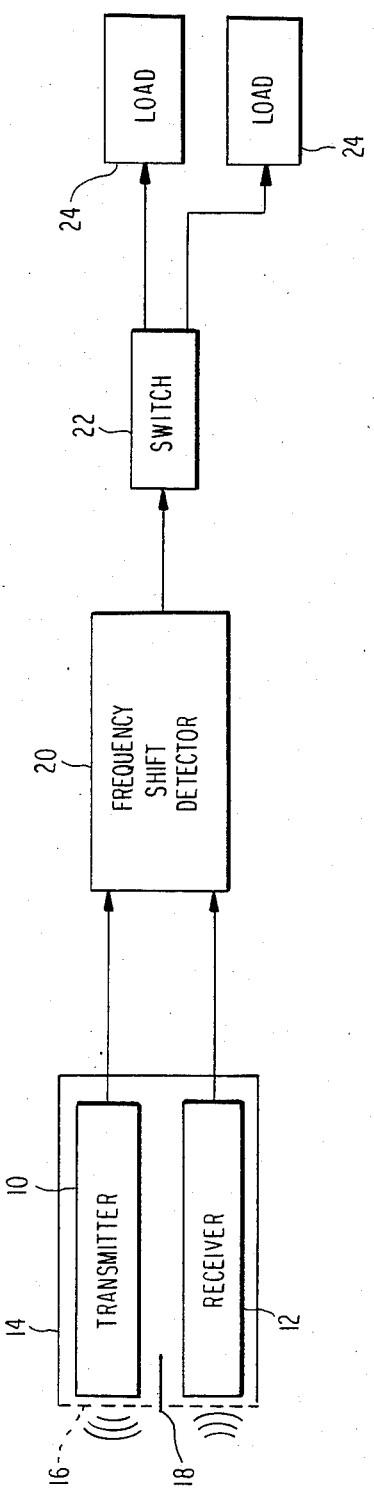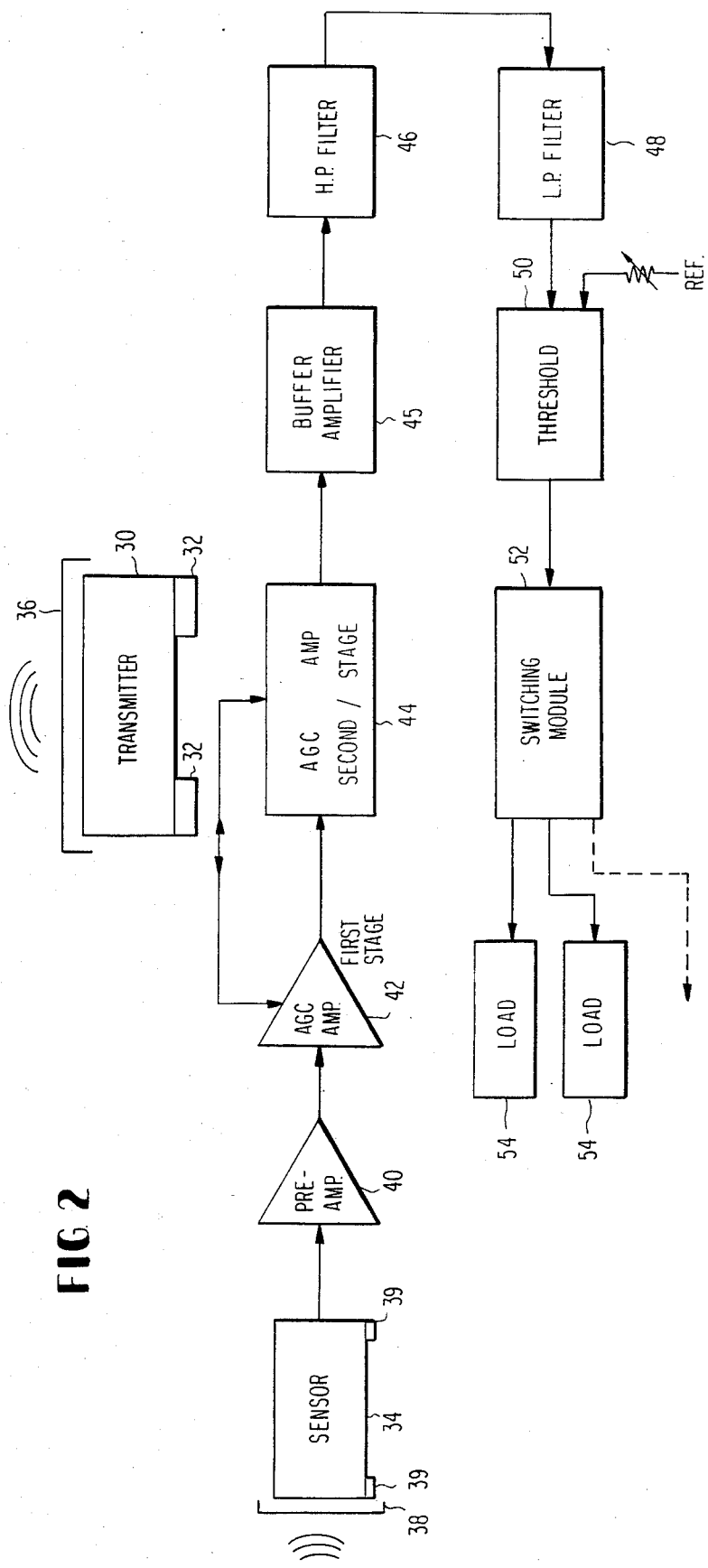

LIGHTING CONTROL SYSTEM AND METHOD

CROSS REFERENCE

The present invention is a continuation of U.S. patent application Ser. No. 270,850, filed June 5, 1981, now abandoned.

BACKGROUND OF THE INVENTION

This invention relates to an automatic lighting circuit control device responsive to the presence of a person within the space to be lighted.

A fundamental approach to presence or motion detection is commonly known as a "Doppler Shift" detector. Systems of this type radiate electromagnetic energy of a predetermined frequency, typically ultrasonic, into the area to be protected and the reflected energy is detected by a suitable conventional receiver. Any movement of an object within the protected area results in a shift between the frequency of the transmitted and detected energy known as the "Doppler Shift". Detection of a Doppler Shift may be utilized to enable an alarm to indicate the presence of an object in motion within the protected space.

Doppler Shift principles have been applied to the control of lighting circuits through the use of a time delay system. See, e.g. U.S. Pat. No. 2,393,014 to Bartholy and U.S. Pat. No. 3,459,961 to Ravas. These and similar patents relating to lighting circuit control devices generally do not distinguish between the requirements of a light control system and an alarm control system. While there is a certain similarity between the requirements for the intrusion detection and lighting control, the requirements of the two systems are not totally compatible in commercial applications, and difficulties have been encountered in the actual use of such systems.

For example, it has been found that triggering of the alarm at a first possible indication of motion is generally intolerable in an intrusion alarm device, in that each false alarm requires inquiry to determine if, in fact, the premises have invaded by an intruder. Further, alarm devices do not require repeated triggering. As a result, alarm devices typically rely on long time integration of the received signals, careful amplitude thresholding, and careful selection of one or more frequencies for detection. Other systems delay an alarm sufficiently to compare the negative Doppler Shift with the positive Doppler Shift to determine whether a symmetrical pattern noncharacteristic of human motion is present.

In certain applications in lighting control systems, it is not generally necessary for the lights to respond instantaneously upon the entrance of a person into the room, but a response is necessary within a short time period thereafter. Further, it is critical in lighting systems that lighting be maintained for only so long as the space is occupied. Thus, the presence of motion must continue to be detected. Also the presence of motion has to be recognized and detected at any spot within the entire monitored space, as contracted with certain critical entry areas.

In dealing with these fundamental differences between alarm and lighting control system, it has been proposed to use a filtering, sensitivity adjusting, amplifying control which automatically adjusts to the amplitude and excursion characteristics of the reflected energy. For example, U.S. Pat. No. 4,193,055 to C. Barnum relies on the fact that human motion typically produces erratic Doppler signals whereas noise typical of air conditioners and the like typically produces a fairly consistent Doppler for an extended period of time. Integration of the signals as typically used in intrusion alarm systems is eliminated to avoid masking a human motion signal, particularly when the motion detected overlaps with a high noise level signal. Such devices automatically adjust the sensitivity level of the system inversely with the amplitude after a predetermined time delay. The time delay permits short term amplitude gain, but suppresses the gain of constant amplitude signals to filter out long term constant noise. Thus, the sensitivity of the system in a noisy environment is automatically lowered when ambient noise is at an appreciable level, and increased in a low noise environment.

It is accordingly an object of the present invention to provide a novel lighting control system and method which obviates the problems associated with the prior art systems.

It is also an object of the present invention to provide a novel method and system for controlling the lighting in spaces as a function of the presence of humans therein.

It is another object of the present invention to provide a novel method and system for the selective zoning of lighting control within a space.

It is still another object of the present invention to provide a novel method and system for eliminating the need for mounting transmitters and receiver in pairs in close proximity to each other.

It is a further object of the present invention to provide a novel method and system for ultrasonic sensing of the presence of personnel in a space in which the receiver and transmitter are mounted orthogonally to each other.

It is yet a further object of the present invention to provide a novel system and method in which the vibration upon energization of the transmitter is prevented from affecting the operation of the receiver.

It is yet still a further object of the present invention to provide a novel method and system for ultrasonic detection which detects the amplitude modulation of the ultrasonic energy within a space as contrasted with the Doppler Shift frequency of the reflected energy.

These and other objects and advantages of the present invention will be readily apparent to one skilled in the art to which the invention pertains and may be more clearly understood from the following detailed description of the preferred embodiment when read in conjunction with the appended drawings.

BRIEF DESCRIPTION OF THE DRAWINGS

FIG. 1 is a functional block diagram of a prior art Doppler Shift frequency system;

FIG. 2 is a functional block diagram of the system of the present invention;

DETAILED DESCRIPTION

Figure 3:
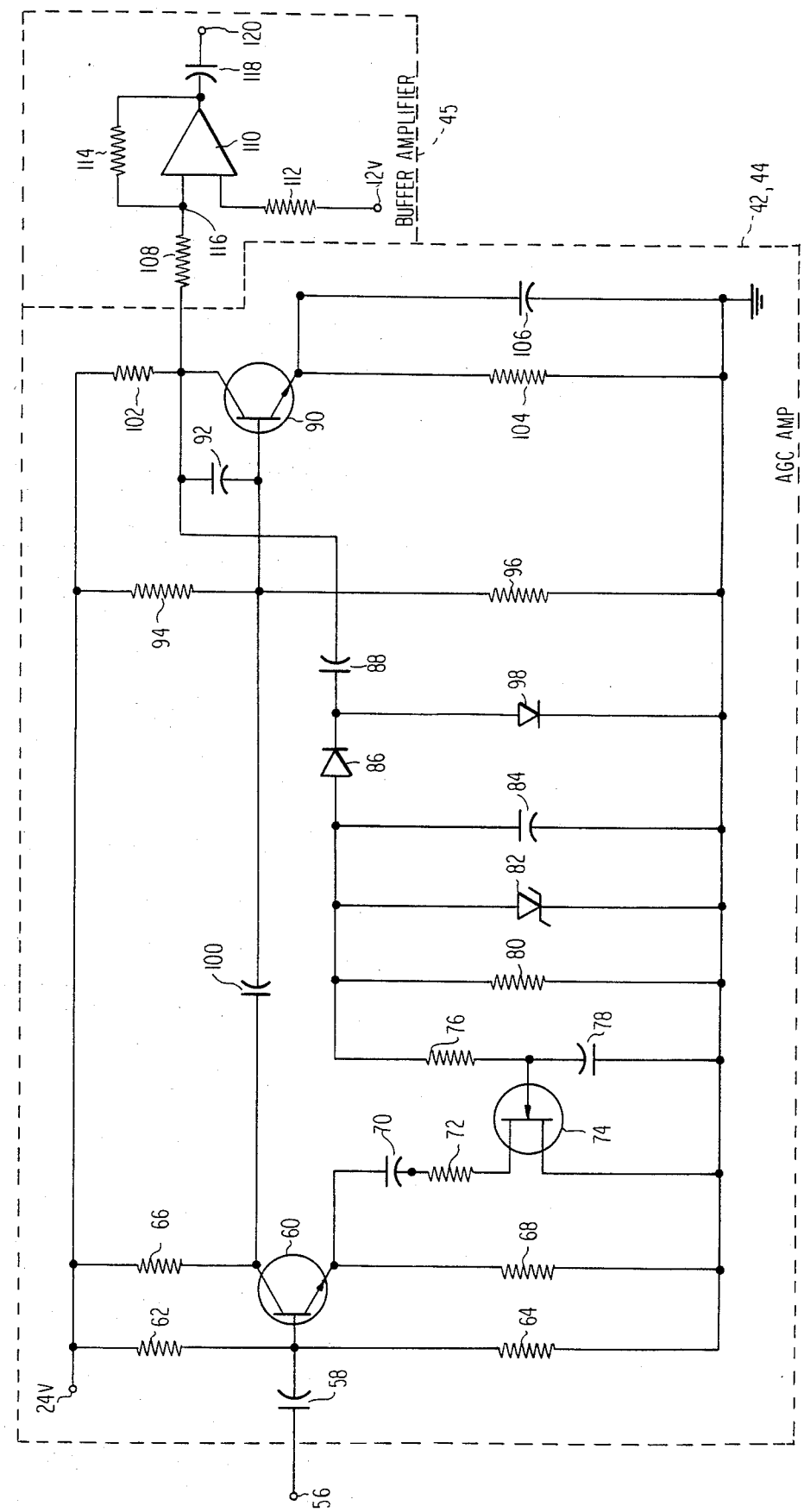
FIG. 3 is a schematic circuit diagram of the AGC amplifier and amplitude detector of FIG. 2.

With reference to FIG. 1 where a typical prior art Doppler Shift detection system is illustrated, the transmitter 10 and receiver 12 are typically mounted within the same housing 14 in a side-by-side configuration. One end 16 of the housing 14 is generally provided with a number of apertures to permit the exit and entry of ultrasonic waves of electromagnetic energy. The side-by-side configuration is utilized to direct the ultrasonic energy out into the space to be protected and to provide for a directional response in the receiver 12. It is important to keep energy from the transmitter 10 from directly entering the receiver 12 and a baffle 18 is generally provided. Even where the transmitter 10 and receiver 12 are located in separate housings, the side-by-side configuration, and typically a baffle between, are maintained.

With continued reference to FIG. 1, the output signal from the receiver 12 is applied to one input terminal of a frequency shift or Doppler detector 20 to which a signal representative of the frequency of the ultrasonic energy transmitted by the transducer 10 is also applied. The frequency shift detector 20 compares the frequency of the transmitted and detected signals to determine frequency shift and the output signal therefrom, when appropriate evaluation is completed, is applied to a switching circuit 22 for controlling the on/off position of one or more loads 24.

The location of the transmitter and receiver in pairs in a side-by-side configuration typically leads to blind spots. Moreover, the use of a mesh or apertured housing for the receiver permits unwanted response to any turbulence of the air within the space being monitored. A further problem exists where the vibration of the transmitter upon its energization is conveyed through the common housing and/or close mounting proximity to the receiver which in turn increases the likelihood of a false response. These and other problems are addressed by the present system as illustrated in FIG. 2.

With reference to FIG. 2, a suitable conventional electrosonic transmitter 30 is positioned to radiate electrosonic energy into the space to be monitored. The transmitter 30 is provided with vibration mountings 32 to reduce the possibility of vibration from the transmitter upon the energization thereof being transmitted through the supporting structure to the sensor 34. The body of the transmitter 30 is mounted within a housing, but its radiating surface is exposed to the space, so it will vibrate and fill the air in the monitored space with the ultrasonic energy. However, the sealing of the transducer within the transmitting unit significantly reduces the effects of air currents on the operation of the system.

The transducer 30 and sensor 34 are mounted in the system of the present invention in an orthogonal configuration. This configuration insures that the energy transmitted by the transmitter 30 will not be directly received by the sensor 34 and no baffle is required.

The sensor 34 is a suitable conventional sensor and is provided with a housing 38 having a closed end in the rear of the housing to thereby reduce the sensitivity of the sensor to any turbulence in the air within the space being monitored. It is also provided with vibration damping mounts 39 to further reduce the possibility of direct influence by the transmitter 30.

The output signal from the sensor 34 is fed through a preamplifier circuit 42 and AGC amplifier 42, 44 of the type described more fully in connection with FIG. 3. The output signal from the AGC amplifier 42, 44 is fed through a buffer amplifier 45, a high pass filter 46, and a low pass filter 48 to a threshold circuit or comparator 50 which provides the detection signal. The comparator 50 is connected to a suitable conventional switching module 52 which controls the on/off condition of a plurality of lighting loads 54.

In operation, the sensor 34 detects the presence of electronic energy within the space being monitored and more particularly detects the recurring patterns of energy as the energy provided by the transmitter 30 is reflected about the space to be monitored. This output signal is conditioned in a suitable conventional preamplifier circuit 40 and applied to the AGC amplifier 42, 44. The output signal from the AGC amplifier 42, 44 is detected to provide a d.c. level signal whose amplitude is representative of the envelope of the energy detected. As is explained in greater detail in connection with FIG. 3, the amplitude of the envelope and drives a N-channel field effect transmitter to control the gain of the first stage AGC amplifer 42. This emphasizes the smaller signals and attenuates the larger signals to provide a time varying d.c. input signal to the buffer amplifier 45.

The output signal from the amplitude buffer 45 is an amplitude modulated wave of 40 KHz. It is applied through a notch filter comprising the high pass filter 46 and low pass filter 48 to the threshold circuit 50 in which the signal passed by the notch filter 46, 48 is compared with a predetermined, variable d.c. standard. If the signal passed by the filter exceeds the predetermined standard, the threshold circuit 50 provides an output signal to the switching module described infra in more detail in connection with FIG. 4. The output signals from the switching module 52 are utilized in a conventional manner through appropriate latching relays to control the on/off condition of one or more electrical loads 54.

With reference to FIG. 3 where the AGC amplifier 44 of FIG. 2 is illustrated in more detail, the output signal from the preamplifier 40 of FIG. 2 is applied to an input terminal 56 from which it is applied through a coupling capacitor 58 to the base input terminal of a NPN transistor 60. Bias for the base electrode of the transistor 60 is provided by resistors 62 and 64 connected in series across a 24 volt source to form a voltage divider network. Power is applied from the 24 volt source to the collector electrode of transistor 60 through a resistor 66 and the emitter electrode of the transistor 60 is grounded through a resistor 68.

The emitter electrode of the transistor 60 is also grounded through a capacitor 70, a resistor 72, and a field effect transistor 74, all connected in series. The trigger or the gate electrode of the field effect transistor 74 is in turn connected to the junction between a series connected resistor 76 and a capacitor 78. The resistor 76 and capacitor 78 are in turn connected across a parallel circuit comprising a resistor 80, a Zener diode 82 and a capacitor 84.

The high voltage side of the capacitor 84 is connected through a diode 86 and a capacitor 88 to the collector electrode of an NPN transistor 90. A capacitor 92 provides a feedback connection between the collector and base electrodes of the transistor 90 to prevent the oscillation thereof, and bias for the base electrode is provided by resistors 94 and 96 which form a voltage divider network. A diode 96 is connected between the junction of diodes 86 and capacitor 98 and ground and the collector electrode of transistor 60 is connected through a capacitor 100 to the base electrode of the transistor 90.

The collector electrode of the transistor 90 is connected through a resistor 102 to the 24 volt source of positive potential and the emitter electrode of transistor 90 is grounded through the parallel combination of a resistor 104 and a capacitor 106. The output signal from the collector electrode of the transistor 90 forms the output signal of the AGC amplifier circuit 42, 44.

The output signal from the AGC amplifier 42, 44 is applied through a resistor 108 to one input terminal of a comparator 110 to which a 12 volt reference voltage is applied through a resistor 112. The output signal from the comparator 110 is fed back through a resistor 114 to the input terminal 116 of the comparator 110, and is also applied through a capacitor 118 to the output terminal 120 of the buffer amplifier 45.

In operation, the output signal from the preamplifier 40 of FIG. 2 is applied to the input terminal 56 of the AGC amplifier shown in FIG. 3. That signal is coupled through the capacitor 58 to the base electrode of the NPN transistor 60 in the first stage of the amplifier.

The presence of a modulated ultrasonic signal on the base electrode of the transistor 60 will cause the transistor 60 to conduct and to provide an output signal at the collector electrode which is coupled through the capacitor 100 to the base electrode of the NPN transistor 90 in the second stage of the AGC amplifier to provide further amplification.

The output signal of transistor 90 is the output signal of the AGC amplifier and in a 40 KHz carrier modulated by the Doppler information. This output signal is also coupled by the capacitor 88 to the detector network, where the positive halfcycle is grounded through the diode 98 and the negative halfcycle is halfwave rectified by the diode 86, filtered by capacitor 84 and applied as a d.c. signal across resistor 80. A timing circuit consisting of resistor 76 and capacitor 78 operates by the charging of the capacitor 78 through the resistor 76 supply the drive signal for the FET 74. An increase or decrease of the collector voltage of transistor 90 will result in a larger or smaller negative potential at the output of the detector, and subsequently in a variation in the bias of the gate electrode of the FET 74 with respect to the source voltage to control the conduction of the FET 74. An increase in FET 74 conduction caused by the reduced negative bias on its gate, will also lower the FET output impedance, resulting in decreased combined emitter impedance network of transistor 60, i.e. the emitter resistor 68 shunted by the source-to-drain impedance of the FET 74 in series with the reactance of capacitor 70 at 40 KHz, and the resistor 72. The output impedance of FET 74 thus varies from infinity or open circuit during the cut-off period (when it is biased to −4 volts) to almost to zero during saturation (when the gate is reverse biased to a potential of about −1 volt).

The FET 74, when saturated, creates the largest shunting effect on the emitter network of the first stage AGC amplifer transistor 60, lowering its total impedance to the maximum designed value and at the same time obtaining the largest available gain and the full output of this stage. The second stage of the AGC amplifer 44 in turn will generate the largest output signal supplying the input signal to the detector and to the buffer amplifier 45, subsequently producing the highest negative output of the detector and the reverse bias on the gate of FET 74. The large reverse bias will force the FET 74 to minimize or cease its conduction thus nullifying the shunting effect of the transistor 60 emitter impedance circuit, decreasing the gain of this stage to its original value and also lowering the output signal from the second stage of amplification.

Such a repetitive feedback process will continue as long as there is a carrier fluctuation in the protected space. Stabilization of the carrier will also equalize the AGC response and deliver a reasonably constant and undistorted input to the buffer amplifier 45 and to the detector within the AGC amplifier circuit 42, 44.

The AGC time delay circuit comprises the resistor 76 and capacitor 78 and connected across the output of the detector. The capacitor 78 is located between the gate and the source of FET 74 and the change in potential on capacitor 78 represents the negative bias of the gate of FET 74 with respect to its source potential.

In operation, the timing capacitor 78 responds to the output of the detector only if the change in the level of the detector's negative output is maintained for a period of time in excess of the period of time required for the capacitor 78 to alter its charge through the resistor 76. Therefore, Doppler signals with small amplitude such as the air turbulance, temperature changes, transients, sudden abrupt noises and other short term excursions are greatly reduced or completely eliminated.

The net results of the AGC amplifier and the time delay circuit associated therewith are: (a) compensation for the environmental changes taking place in the monitord space, (b) stabilization of the carrier signal, preventing saturation during amplification and thus preserving the Doppler information, and (c) achieving a suitable signal-to-noise ratio while maintaining very large amplication of the carrier.

Figure 4:
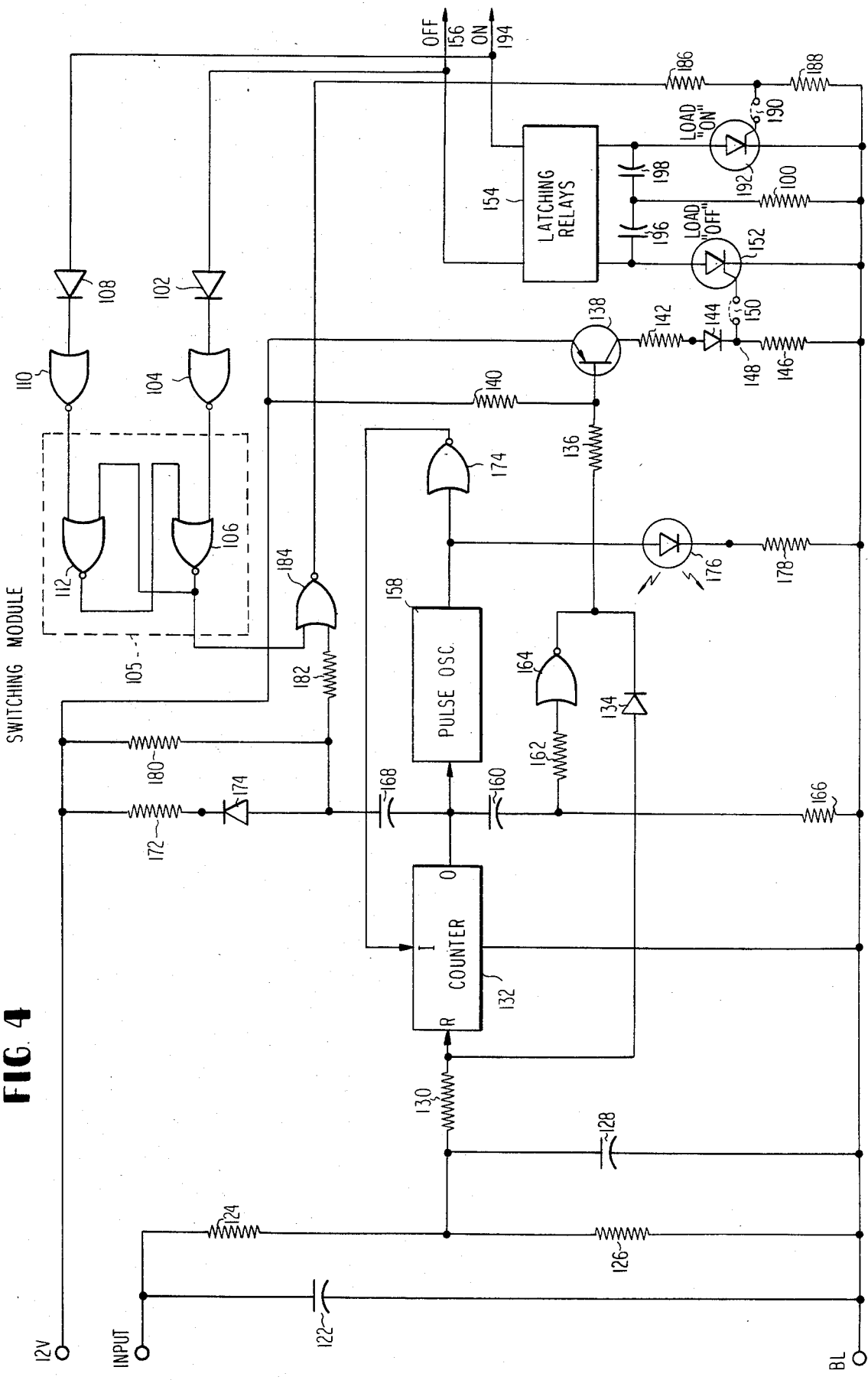
FIG. 4 is a schematic circuit diagram of the switching module of the system of FIG. 2.

With reference to FIG. 4, the input terminal 120 to the switching module 52 there illustrated is directly connected to the output terminal 120 of the buffer amplitude 45 of FIG. 3. The input signal is applied across a capacitor 122 in parallel with a voltage divider network comprising resistors 124 and 126. The potential taken from the junction of the resistors 124 and 126 is applied across a filter capacitor 128 and through a limiting resistor 130 to a reset input terminal R of a suitable conventional resetable counter 132.

This signal is also applied through a diode 134 and a resistor 136 to the base electrode of a PNP transistor 138 for noise immunity. The emitter electrode of the transistor 138 is directly connected to a 12 volt source of positive potential and the base electrode thereof is connected through a resistor 140 to the same source to prevent the thermal runout of the transistor 138. The collector electrode of the transistor 138 is grounded through the series connection of a resistor 142, an isolated diode 144 and a terminating resistor 146.

The junction 148 between the cathode of the diode 144 and the resistor 146 is connected by way of a jumper connection 150 to the gate of a suitable conventional SCR 152. The cathode of the SCR 152 is grounded and the anode is connected through an "off" winding of a suitable conventional latching relay circuit 154 to the auxilliary a.c. power source.

The output signal from the counter 132 is applied directly to a suitable conventional pulse oscillator 158. A capacitor 160 and resistor 162 form a differentiator network to generate a 100 ms positive-going pulse, which is inverted by the inverter 164 to drive the transistor 138 into conduction. The output signal from transistor 138 triggers the SCR 152 to energize the "off" winding of a latching relay and to disconnect the load.

The output signal from the pulse oscillator 158 is also fed back through an inverter 174 to the input terminal I of the counter 132. The output signal from the pulse oscillator 158 is also applied through a light emitting diode 176 and a resistor 178 to ground.

The 12 volt source of positive potential is also applied through resistors 180 and 182 to one input terminal of a two input terminal NOR gate 184 to inhibit it. The NOR gate 184 is enabled by the 100 ms pulse of negative polarity derived from the output of the counter 132 at the time of reset and generated by the pulse forming or integrating circuit comprised of capacitor 168 and the resistor 180.

The output terminal of the NOR gate 184 is connected through a current limiting resistor 186 to the gate of a second SCR 192. When triggered, the SCR 192 energizes the "on" winding of the latching relay to connect the load. The interconnection of the resistors 186 and 188 is connected through a jumper 190 to the gate terminal of a SCR 192. The cathode of the SCR 192 is grounded and the anode thereof connected to the "on" winding of a suitable latching relay circuit 154 and to the auxilliary a.c. power source. The anode of both of the SCRs 152 and 192 are connected through capacitors 196 and 198 respectively and a common resistor 198 to ground potential for noise and transient suppression.

The "off" output signal from the latching relay circuit 154 is applied through a diode 102 and inverter 104 to one input terminal of a bistable multivibrator 105. Similarly, the "on" output signal from the latching relay circuit 154 is applied through a diode 108 and an inverter 110 to one input terminal of the NOR gates 112 and 106 are connected respectively to the other input terminal of the NOR gates 106 and 112 forming above mentioned latching flip-flop or multivibrator. The output signal from the multivibrator is applied to the other input terminal of the NOR gate 184 to drive the SCR 192 into conduction and to then energize the "on" winding of the latching relay.

In operation, a signal indicative of the detection of motion is applied from the threshold circuit 50 of FIG. 3 to the input terminal 120 of the switching module illustrated in FIG. 4. Because of the equal resistance of the resistor 126 and the resistor 124, the 24 volt signal from the threshold circuit 50 is divided in half and provided as a positive potential to the capacitor 128. The level of the voltage across capacitor 128 and resistor 126 is a function of the threshold circuit 50 and must be half the output of the threshold circuit to insure reliable resetting of the counter 132.

The potential appearing across the capacitor 128 is also applied through limiting resistor 130, diode 134 and resistor 136 to the transistor 138. The application of a positive potential to the base electrode of the PNP transistor 138 will bias the transistor 138 out of conduction and thus prevent possible ambiguity between the two latching relay windings. When SCR 152 conducts, a 100 ms signal is generated on the output terminal 156 of the latching relay circuit 154. That signal grounds the "off" winding thereby energizing it, and is fed back through the diode 102, inverted and applied to the NOR gate 106 latching the flip-flop 105 and inhibiting the "on" logic. The output signal from the gate 106 is positive. This positive signal is applied to the input of the NOR gate 184, to generate a negative output signal which inhibits the conduction of the "on" SCR 192.

However, in the absence of sufficient pulses from the 50 of FIG. 3 as applied to the input terminal 120 of the switching module of FIG. 4, the counter 132 is not reset and the output signal therefrom enables the pulse oscillator 152 to continuously provide input signals to the counter 132. So long as the pulse oscillator 158 is in operation, the light emitting diode 176 will be operative to provide an indication for the diagnostic purposes that the circuit is functioning properly.

In addition, the output signal from the counter 132 is applied to the base electrode of the transistor 138 as a 100 ms pulse. Because of the presence of the inverter 164, the signal applied to the base electrode of the transistor 138 is negative which causes the transistor 138 to saturate and to thereby apply a positive going potential of 100 ms duration to the trigger of the SCR 152. When the SCR 152 conducts, the "off" winding of the the latching relay circuit 154 is energized and the lights are turned off.

The principles, preferred embodiments and modes of operation of the present invention have been described in the foregoing specification. The invention which is intended to be protected is not, however, to be construed as limited to the particular forms disclosed, since these are to be regarded as illustrative rather than restrictive. Variations and changes therefore may be made by those skilled in the art without departing from the spirit and scope of the present invention.

What is claimed is:

1. A lighting system for a space comprising:
 (a) a source of illumination for the space;
 (b) a control circuit for said source of illumination;
 (c) means for radiating electromagnetic energy at a predetermined ultrasonic frequency and at a generally constant amplitude into the space to be monitored;
 (d) means for detecting electromagnetic energy reflected from the objects in the space, said energy being in the form of the radiated ultrasonic energy modulated by a signal representing any motion within the space, said means providing a first signal;
 (e) means for automatically adjusting the amplitude of said first signal to within predetermined limits;
 (f) means for filtering out the frequency components of the amplitude adjusted first signal other than the predetermined frequency; and
 (g) means for detecting variations in the amplitude of said first signal in excess of said predetermined limit to generate a control signal in response thereto to energize and deenergize said illumination control circuit.

2. The system of claim 1 wherein said electromagnetic energy detecting means and said electromagnetic energy radiating means are mounted on orthogonal axis.

3. The system of claim 1 wherein said means for radiating electromagnetic energy and said means for detecting electromagnetic energy are both provided with a vibration damping mounting.

4. The system of claim 1 including a second electromagnetic energy detecting means spaced from said first mentioned electromagnetic energy detecting means for detecting electromagnetic energy reflected from objects in the space and for affecting the operation of said control signal generating means.

5. The system of claim 1, wherein said amplitude detection means for generating a control signal is adapted to provide a reset signal and a first control signal to effect energization of said illumination control circuit, and wherein said system further includes a timing circuit responsive to each reset signal generated, means for generating a second control signal responsive to the absence of a reset signal within a predetermined time period following each said reset signal, and means for applying the second control signal to said illumination control circuit to effect deenergization thereof.

6. The system of claim 1 wherein said system further includes manually operable means for selectively applying said control signal to said illumination control circuit.

7. A method of controling a lighting circuit for a space comprising the steps of:
(a) radiating electromagnetic energy into a space at a predetermined ultrasonic frequency and generally constant amplitude;
(b) detecting electromagnetic reflected from the space to provide a first signal;
(c) automatically adjusting the amplitude of said first signal to within predetermined limits;
(d) filtering out frequency components of the amplitude adjusted first signal other then the predetermined fequency;
(e) detecting amplitude excursions in excess of a predetermined limit to provide a reset signal and a first control signal;
(f) enabling a timing circuit responsively to each reset signal;
(g) applying the first control signal to the lighting circuit to effect the energization thereof;
(h) generating a second lighting circuit control signal responsively to the absense of a reset signal within a predetermined time period following each reset signal; and
(i) applying the second control signal to the lighting circuit to effect the denergization thereof.

8. The method of claim 7 including the preliminary step of manually effecting the operation of an override circuit to thereby control the generation of at least one of the control signals.

* * * * *